US005483781A

United States Patent [19]

Ernst et al.

[11] Patent Number: 5,483,781
[45] Date of Patent: Jan. 16, 1996

[54] CONSTRUCTION FASTENER ASSEMBLY

[75] Inventors: Richard J. Ernst, Palatine; Mark S. Timmerman, Elgin, both of Ill.

[73] Assignee: Illinois Tool Works Inc., Glenview, Ill.

[21] Appl. No.: 258,841

[22] Filed: Jun. 13, 1994

[51] Int. Cl.[6] ..... E21D 20/02

[52] U.S. Cl. ..... 52/698; 411/82; 405/259.5; 405/259.6

[58] Field of Search ..... 411/82, 258; 405/259.5, 405/259.6; 52/698

[56] References Cited

U.S. PATENT DOCUMENTS

| | | | |
|---|---|---|---|
| 2,849,866 | 9/1958 | Flygare et al. . | |
| 3,703,790 | 11/1972 | Mattes et al. . | |
| 3,877,235 | 4/1975 | Hill | 52/698 X |
| 3,901,039 | 8/1975 | Lundkvist . | |
| 4,063,582 | 12/1977 | Fischer . | |
| 4,139,323 | 2/1979 | Brandstetter . | |
| 4,224,971 | 9/1980 | Muller et al. . | |
| 4,313,696 | 2/1982 | Horten . | |
| 4,314,778 | 2/1982 | Cantrel . | |
| 4,430,025 | 2/1984 | Ciavatta . | |
| 4,490,074 | 12/1984 | Chaiko . | |
| 4,518,292 | 5/1985 | Calandra, Jr. | 411/82 X |
| 4,528,792 | 7/1985 | Cross et al. . | |
| 4,620,406 | 11/1986 | Hugel et al. . | |
| 4,662,795 | 5/1987 | Clark et al. | 405/259.5 X |
| 4,696,606 | 9/1987 | Herron . | |
| 4,773,794 | 9/1988 | Harke . | |
| 4,787,186 | 11/1988 | Irmscher et al. . | |
| 4,790,114 | 12/1988 | Falco . | |
| 4,913,593 | 4/1990 | Clark et al. | 405/259.5 |
| 4,930,284 | 6/1990 | Falco . | |
| 4,968,185 | 11/1990 | Leibhard et al. . | |
| 4,984,938 | 1/1991 | Scott, Jr. et al. | 405/259.5 |
| 5,104,266 | 4/1992 | Daryoush et al. . | |
| 5,161,916 | 11/1992 | White et al. | 411/82 X |
| 5,232,311 | 8/1993 | Stankus | 405/259.5 |
| 5,263,804 | 11/1993 | Ernst et al. | 411/82 |

*Primary Examiner*—Wynn E. Wood
*Attorney, Agent, or Firm*—Schwartz & Weinrieb

[57] ABSTRACT

A construction fastener assembly to be secured with an adhesive within an aperture of a structure such as masonry, concrete, metal or the like where the fastener assembly includes an elongate fastener member having a first end for insertion within the aperture and a second opposite end accessible from the exterior of the aperture. An adhesive retaining member is secured to the first end of the fastener member for accepting adhesive therein, for flexibly collapsing upon insertion of the retaining member and the fastener member within the aperture and for ejecting the adhesive from the retaining member into the aperture to secure the fastener member therein.

15 Claims, 3 Drawing Sheets

16
38
10
22
36
24
28
28
28
18
30
32

12
36
14
22
36
24
28
28
28
30
18
10
32
26
20
34

CONSTRUCTION FASTENER ASSEMBLY

FIELD OF THE INVENTION

The present invention relates generally to construction fasteners, and more particularly to a construction anchor or bolt which is adhesively bonded within an aperture defined in a structure formed from masonry, concrete, metal or the like that includes an adhesive retaining member secured to the anchor or bolt which accepts and displaces a predetermined amount of adhesive when inserted within the aperture with the anchor or bolt which assures the proper amount of adhesive is utilized thus increasing the strength of the bond while reducing waste or squeeze out of adhesive. When applied to ceilings it also reduces the potential for drip.

BACKGROUND OF THE INVENTION

Construction anchors and bolts are typically adhesively bonded within apertures formed in masonry, concrete and similar structures. Such anchors and bolts are frequently made of metal and are substantially cylindrical in shape, the anchors including a longitudinally threaded bore and the bolts being threaded about their peripheries. After being secured to the surface, other objects can be readily secured to or suspended from the anchors or bolts.

An example of an adhesively secured construction anchor is illustrated in U.S. Pat. No. 5,263,804 which is assigned to the present assignee. To install that anchor, an aperture is drilled into the masonry surface and then cleaned of debris. A construction adhesive, such as epoxy, is then injected into the aperture from an injection gun. The anchor is inserted within the aperture with a cap positioning the anchor at a desired depth while the adhesive sets to secure the anchor thereto.

An important criteria in securing such anchors is providing the proper size aperture and corresponding amount of adhesive within the aperture for the particular size anchor being utilized. If the amount of adhesive is too little, the anchor may not be properly secured to the structure or air pockets may develop within the mixture.

If too much adhesive is utilized, adhesive may squeeze out of the aperture upon insertion of the anchor which is undesirable. In use, to ensure enough adhesive is applied, the aperture is frequently completely filled with adhesive. Upon insertion of the anchor, approximately 80% of the adhesive is squeezed out and wasted.

Adhesive squeeze out is particularly a problem when the anchor is being secured to a ceiling of a structure since the adhesive may fall onto and injure a user. Additionally, when secured to a ceiling, the adhesive may fall out before the anchor is set therein and/or extrude out due to hydraulic pressures created by air pockets.

As FIG. 6 illustrates, existing fasteners have attempted to solve such problems by employing a separate, tubular metal screen 100 for use with an anchor 102. At the point of installation of such a fastener, the metal screen 100 is inserted over the interior end of the anchor 102 to a random position and is loosely retained on the anchor 102 by friction. The tubular metal screen 100 is then filled with adhesive which is sufficiently viscous to prevent adhesive from seeping through the mesh of the screen.

The metal screen 100 and anchor 102 are then inserted within the aperture, screen first. Upon contacting the bottom of the aperture, the metal screen 100 is forced along the length of the anchor 102 to the position illustrated in FIG. 6.

At the same time, the adhesive is expelled from the metal screen 100 and flows about the metal screen 100 and the anchor 102 to secure both the metal screen 100 and anchor 102 within the aperture upon setting.

Such a metal screen 100, however, does not enable proper bonding of the anchor 102 directly to the structure. Accordingly, the pull out strength of the anchor 102 is reduced. Additionally, since the metal screen 100 is loosely and movably placed on the anchor 102 at the point of application, the proper amount of adhesive may not be employed. Furthermore, the metal screen 100 may interfere with the adhesive's bond with the wall of the aperture.

It therefore would be desirable to provide a construction fastener having an adhesive retaining member secured thereto which enables a measured amount of adhesive to be applied within a prescribed aperture of a structure which releases the adhesive upon insertion of the retaining member and fastener within the aperture and does not interfere with the bonding power of the adhesive.

SUMMARY OF THE INVENTION

The invention provides a construction fastener assembly to be secured with an adhesive within an aperture of a structure such as masonry, concrete, metal or the like. The fastener assembly includes an elongate fastener member having a first end for insertion within the aperture and a second opposite end accessible from the exterior of the aperture.

An adhesive retaining member is secured to the first end of the fastener member for accepting adhesive therein, for flexibly collapsing upon insertion of the retaining member and the fastener member within the aperture and for ejecting the adhesive from the retaining member into the aperture to secure the fastener member therein.

The retaining member is preferably formed from plastic or metal as a tubular screen, a bellows, or a perforated or slotted member and accepts a predetermined amount of adhesive therein. Thus, the correct amount of adhesive required for the prescribed aperture and fastener member is utilized to reduce wasting of adhesive and squeeze out of adhesive from the aperture while providing the desired adhesion.

BRIEF DESCRIPTION OF THE DRAWINGS

Various other objects, features, and attendant advantages of the present invention will be more fully appreciated from the following detailed description when considered in connection with the accompanying drawings in which like reference characters represent like or corresponding parts throughout the several views, and wherein.

DESCRIPTION OF THE PREFERRED EMBODIMENTS

Figure 1:
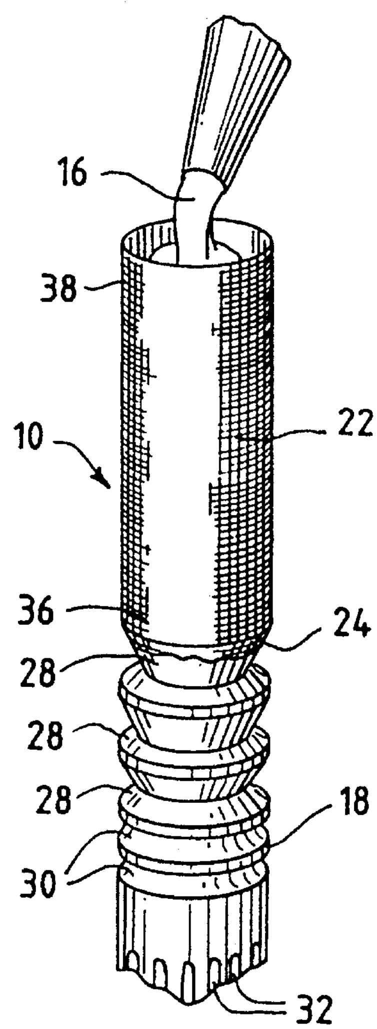
FIG. 1 is a perspective view of an anchor and adhesive retaining member of the invention illustrated as being filled with an adhesive.
Figure 2:
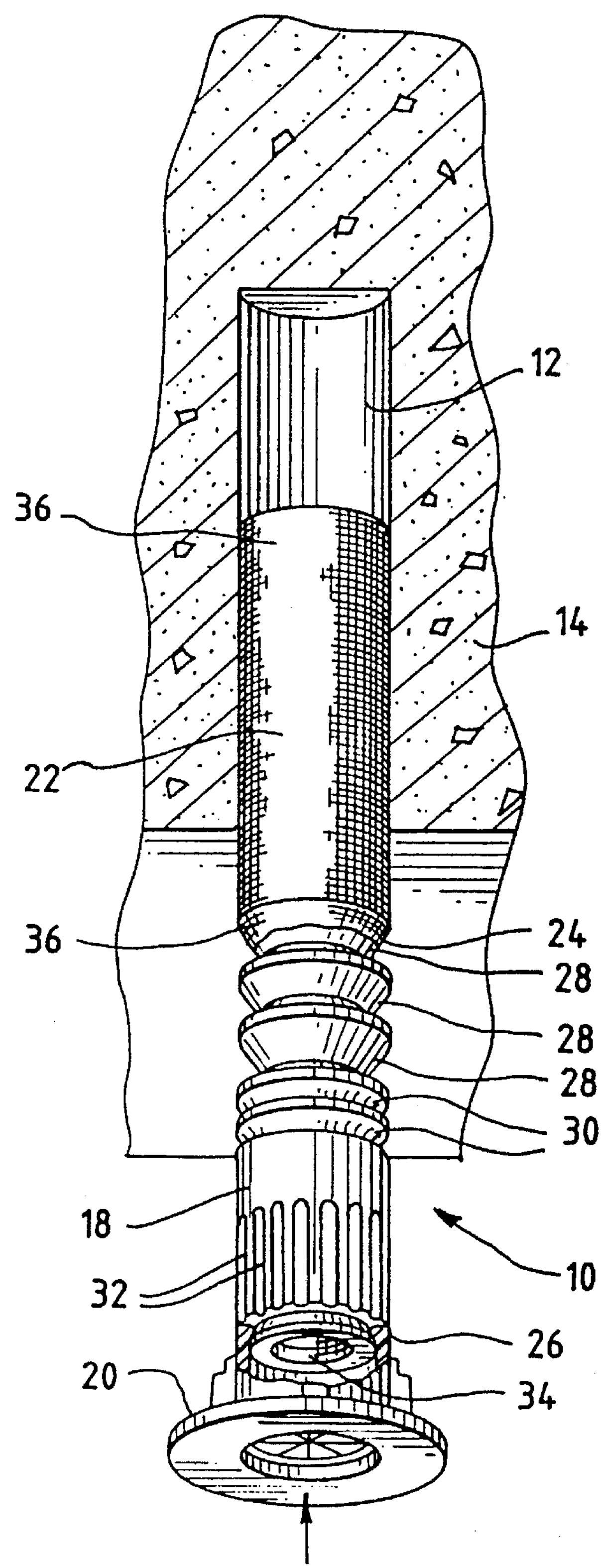
FIG. 2 is a perspective partial sectional view of the anchor and adhesive retaining member of the invention illustrated as being inserted within an aperture of a structure.

Referring to FIG. 2, a construction fastener of the invention is generally designated by the reference numeral 10. The fastener 10 is preferably secured within an aperture 12 of a structure 14, such as masonry, concrete, metal or any similar structure, with an adhesive, such as epoxy or the like, generally illustrated in FIG. 1 with the reference numeral 16.

The fastener 10 substantially includes a fastener member 18, a cap 20 and an adhesive retaining member 22. For ease of use, the fastener 10 is provided as a unitary, one-piece article as described in detail below. Alternatively, the fastener 10 can be assembled at a job site prior to use.

As FIGS. 1–4 illustrate, the fastener member 18 and cap 20 are substantially similar to the anchor and cap of above-referenced U.S. Pat. No. 5,263,804, the disclosure of which is hereby incorporated by reference.

The fastener member 18 is preferably made of metal, such as zinc-plated steel, but the particular material can vary and can be plastic or similar material if desired.

Figure 5:
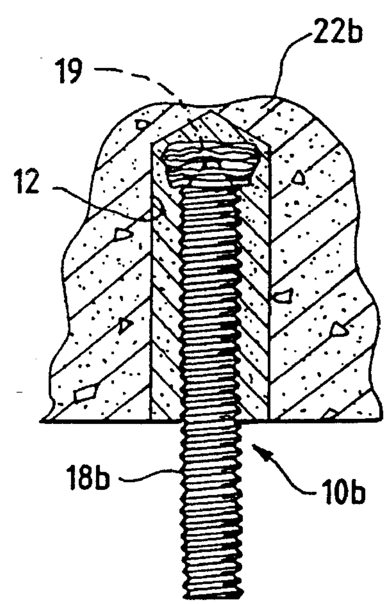
FIG. 5 is a side elevational view of another embodiment of the present invention illustrating a bolt and an adhesive retaining member of the invention secured within an aperture.
Figure 6:
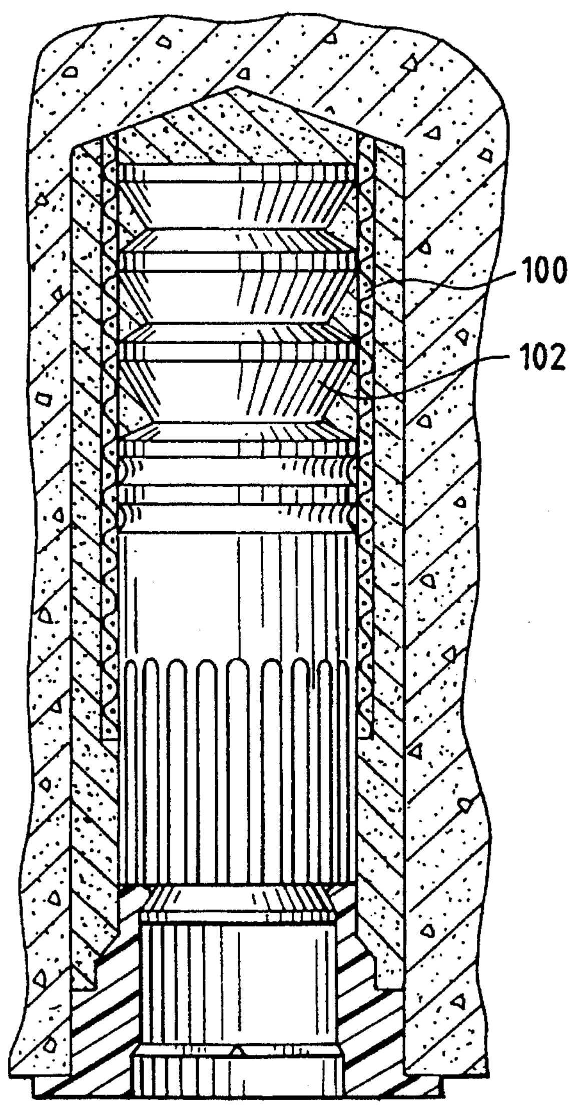
FIG. 6 is a side elevation view of a prior art fastener and metal screen illustrated within an aperture of a structure.

Alternatively, as FIG. 5 illustrates, the fastener **10*b* can be a threaded bolt 18*b* with the attached adhesive retaining member 22*b* which does not include any cap. Preferably, the bolt 18*b* has an end 19 which is pointed along an edge for line contact within the aperture 12. For ease of description the present invention will be described as it applies to the anchor-type fastener member 18**.

As FIG. 2 illustrates, the fastener member 18 includes a first distal insertion end 24 and a second opposite proximal end 26 which is accessible from the exterior of the aperture 12. To resist extraction or pull out of the fastener 18 from the aperture 12 after setting of the adhesive 16, the fastener 18 includes a plurality of major grooves 28 and a plurality of minor grooves 30.

The major grooves 28 are positioned along the length of the fastener member 18 proximate the first end 24. The minor grooves 30 are positioned between the major grooves 28 and the second end 26. Although three major grooves 28 and two minor grooves 30 are illustrated, the number, shape and position of the major and minor grooves 28 and 30 can vary.

In order to resist rotation of the fastener member 18 within the aperture 12 after setting of the adhesive 16, the fastener member 18 can include a plurality of longitudinal splines or flats 32. The splines 32 are positioned proximate the second end 26 of the fastener member 18 and extend a predetermined length along the fastener member 18, which can vary.

As FIG. 2 illustrates, the second end 26 of the fastener member 18 includes an axial threaded bore 34 which extends a predetermined distance within the fastener member 18. The bore 34 can accept a threaded bolt (not illustrated) or other member for securing another article thereto.

The cap 20 protects the threaded bore 34 and prevents debris and adhesive 16 from entering the bore 34 before use. The cap 20 also assists in seating the fastener member 18 to a desired depth within the aperture 12 so that proper tensile strength can be achieved. Structural details of the cap 20 are provided in above-referenced U.S. Pat. No. 5,263,804.

The adhesive retaining member 22 is formed as a tubular member having first and second open ends 36 and 38. The adhesive retaining member 22 is preferably formed from plastic, such as plastic screen, film or metal, and is flexible enough to readily collapse as described below yet rigid enough to accept and retain the adhesive 16 therein during insertion within the aperture 12.

The particular material and structure of the adhesive retaining member 22 can vary so long as it functions as described herein. When the adhesive retaining member 22 is formed from screen, the screen size is preferably selected so that the adhesive 16 does not flow through the screen when initially injected into the retaining member 22 before insertion into the aperture 12, due to the viscosity of the adhesive 16.

Figure 7:
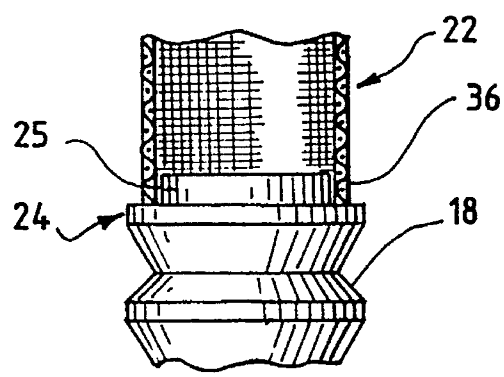
FIG. 7 is a side elevational view of another embodiment of the present invention illustrating a bolt and an adhesive retaining member of the invention.

One of the ends 36 or 38 is secured to the first distal end 24 of the fastener member 18, such as with an adhesive, spot welding, ultrasonic welding or any other method. Alternatively, the retaining member 22 can be secured to the distal end 24 of the fastener member 18 with a snug press fit, as FIG. 7 illustrates. For ease of description, the end 36 of the adhesive retaining member 22 will be described as secured to the fastener member 18.

The end 36 of the adhesive retaining member 22 is inserted over the first end 24 of the fastener member 18, tightened within one of the major grooves 28 and then secured therein with a spot or ultrasonic weld. Alternatively, as FIG. 7 illustrates, the end 36 of the adhesive retaining member 22 can be press fit over a mounting post 25 formed on the distal end 24 of the fastener member 18.

The length and diameter of the adhesive retaining member 22 is selected so that when secured to the fastener member 18 it can be filled with a desired amount of adhesive 16 to provide the exact amount of adhesive 16 to optimize anchor performance. In the embodiment of FIG. 5, the adhesive retaining member **22*b* is secured to the last few threads of the bolt 18*b***.

The dimensions of the adhesive retaining member 22 are selected so that the required amount of adhesive 16 is supplied within the aperture 12 for a given size aperture 12 and fastener member 18. Such an amount provides the desired bonding and pull out force while reducing the amount of wasted adhesive 16 and preventing squeeze out and dripping of adhesive 16 from the aperture 12.

In use, the aperture 12 is drilled into the structure 14 and thereafter cleaned of debris. As FIG. 1 illustrates, the adhesive retaining member 22 is then filled with the adhesive 16.

Figure 4:
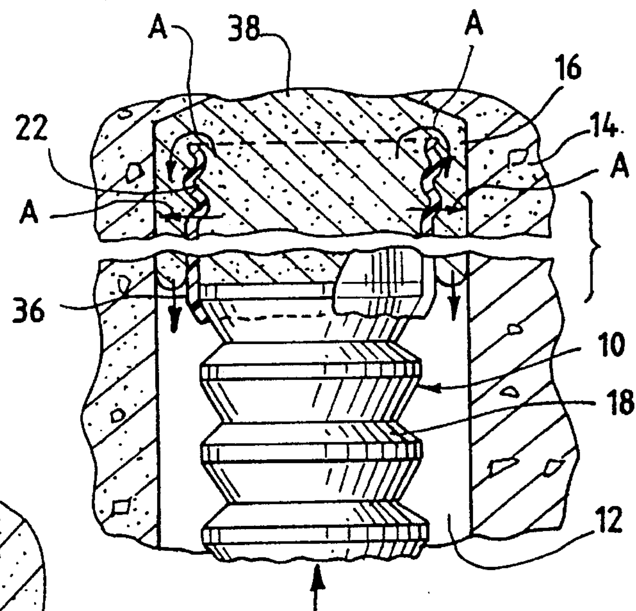
FIG. 4 is a side elevational view of an intermediate insertion position of the anchor and adhesive retaining member of the invention illustrating the adhesive being expelled from the retaining member as it collapses within the aperture.

As FIG. 2 illustrates, the filled adhesive retaining member 22 and attached fastener member 18 are then inserted within the aperture 12. As FIG. 4 illustrates, upon engagement of the end 38 of the adhesive retaining member 22 with the bottom of the aperture 12, the adhesive retaining member 22 begins to collapse. During collapsing of the adhesive retaining member 22, adhesive 16 is forced out of the open end 38 and, if a screen is utilized, out of the screen openings substantially in the direction of arrows "A" into the aperture 12 and about the fastener member 18.

Figure 3:
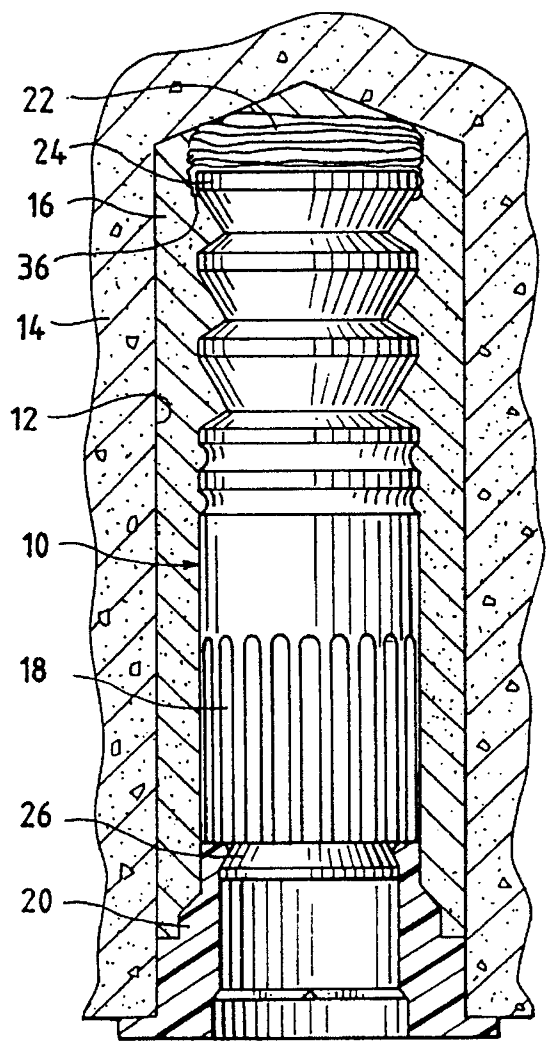
FIG. 3 is a side elevational view of the anchor and adhesive retaining member of the invention illustrated its final position within the aperture.

As FIG. 3 illustrates, due to the portioned amount of adhesive 16 within the adhesive retaining member 22, substantially the entire area within the aperture 12 about the fastener 18 is filled with adhesive 16. Accordingly, the proper bond and pull out strength are provided without underfilling the aperture 12 or providing excess waste or squeeze out of adhesive.

The fastener 10 is particularly useful when the structure 14 is a ceiling. In such a situation, the adhesive typically drips out before installing the fastener. The adhesive retaining member 22 and fastener member 18 can be readily inserted vertically within the aperture 12 without adhesive 16 falling out of the adhesive retaining member 22 after filling.

Modifications and variations of the present invention are possible in light of the above teachings. It is to be understood that within the scope of the claims the invention may be practiced other than specifically described.

We claim:

1. A construction fastener assembly to be secured with an adhesive within a bore of a structure such as masonry, concrete, metal, or the like, comprising:

an elongate fastener member having a shank portion, a first end for insertion within bore of structure, and a second opposite end which is accessible from a position exterior of said bore when said fastener member is inserted within said bore of said structure; and a collapsible adhesive retaining means having one end thereof secured to said first end of said fastener member and a second opposite open end accepting an adhesive therein, for flexibly collapsing upon continued insertion of said adhesive retaining means and said fastener member within said bore of said structure such that said adhesive retaining means is confined between said first end of said fastener member and the interior end of said bore when said adhesive retaining means is collapsed upon full insertion of said adhesive retaining means and said fastener member within said bore of said structure, and for ejecting said adhesive out from said second open end of said adhesive retaining means and into said bore of said structure so as to annularly surround said shank portion of said fastener member and thereby secure said fastener member within said bore of said structure when said adhesive retaining means is collapsed upon full insertion of said adhesive retaining means and said fastener member within said bore of said structure.

2. The fastener assembly as defined in claim 1 wherein said adhesive retaining means can accept a predetermined amount of adhesive therein for providing the correct amount of adhesive required for the prescribed bore and fastener member to securely attach said fastener member to the structure, reduce wasting adhesive, prevent adhesive from squeezing out of the bore and avoid underfilling of the bore.

3. The fastener assembly as defined in claim 1 wherein said adhesive retaining means is formed from plastic.

4. The fastener assembly as defined in claim 1 wherein said adhesive retaining means is formed as a tubular member.

5. The fastener assembly as defined in claim 1 wherein said fastener member is formed as an anchor.

6. The member fastener assembly as defined in claim 1 wherein said fastener member is formed as a bolt.

7. The member fastener assembly as defined in claim 1 wherein said adhesive retaining means is formed from at least one of plastic film, metal foil and a woven material.

8. The fastener assembly as defined in claim 1 wherein said adhesive retaining means is formed from an extruded material.

9. The fastener assembly as set forth in claim 4, wherein:

said tubular member comprises screen material.

10. The fastener assembly as set forth in claim 9, wherein:

said screen material has mesh apertures which have a predetermined size so as to retain said adhesive within said tubular member before said adhesive retaining means and said fastener member are inserted within said bore of said structure, and yet permit said adhesive to flow through said apertures while said adhesive retaining means and said fastener member are being inserted within said bore of said structure and during said collapse of said adhesive retaining means.

11. The fastener assembly as set forth in claim 1, wherein:

said fastener member is formed from one of metal and plastic materials.

12. The fastener assembly as set forth in claim 5, wherein:

said anchor member comprises an axial threaded bore defined within said second opposite end for receiving a threaded bolt therein.

13. The fastener assembly as set forth in claim 1, wherein:

said shank portion of said fastener member is provided, upon the exterior periphery thereof, with a plurality of transversely oriented, circumferentially extending grooves within which said adhesive will be disposed when ejected from said adhesive retaining means so as to effectively prevent extraction of said fastener member from said bore of said structure once said adhesive has set within said bore of said structure.

14. The fastener assembly as set forth in claim 1, wherein:

said shank portion of said fastener member comprises, upon an exterior peripheral surface portion thereof, a plurality of axially oriented splines disposed within a circumferential array about said exterior peripheral surface of said shank portion of said fastener member and between which said adhesive will be disposed when ejected from said adhesive retaining means so as to effectively prevent rotation of said fastener member within said bore of said structure once said adhesive has set within said bore of said structure.

15. The fastener assembly as set forth in claim 1, wherein:

said adhesive retaining means is secured to said first end of said fastener member by one of adhesive, spot welding, ultrasonic welding, and friction fit means.

* * * * *